US011054191B2

(12) United States Patent
Chopard et al.

(10) Patent No.: US 11,054,191 B2
(45) Date of Patent: Jul. 6, 2021

(54) MOVING DEVICE FOR CENTERING IN A PIPE

(71) Applicant: Hutchinson, Paris (FR)

(72) Inventors: Fabrice Chopard, Saint-Martin-d'Hères (FR); Boris Chauvet, Ferrières (FR); Mathieu Leborgne, Montargis (FR)

(73) Assignee: Hutchinson, Paris (FR)

( * ) Notice: Subject to any disclaimer, the term of this patent is extended or adjusted under 35 U.S.C. 154(b) by 120 days.

(21) Appl. No.: 16/307,837

(22) PCT Filed: Jun. 9, 2017

(86) PCT No.: PCT/FR2017/051483
§ 371 (c)(1),
(2) Date: Dec. 6, 2018

(87) PCT Pub. No.: WO2017/212199
PCT Pub. Date: Dec. 14, 2017

(65) Prior Publication Data
US 2019/0264991 A1  Aug. 29, 2019

(30) Foreign Application Priority Data

Jun. 10, 2016 (FR) ...................................... 1655391

(51) Int. Cl.
*F28D 20/02* (2006.01)
*F28D 20/00* (2006.01)

(52) U.S. Cl.
CPC .... *F28D 20/023* (2013.01); *F28D 2020/0013* (2013.01); *F28D 2020/0021* (2013.01); *Y02E 60/14* (2013.01)

(58) Field of Classification Search
CPC ........... F28D 20/023; F28D 2020/0013; F28D 2020/0021; F28D 2020/0017; F28D 2020/006; F28D 2020/0091; F28D 20/021; Y02E 60/145
USPC .................................. 138/108, 113, 114, 117
See application file for complete search history.

(56) References Cited

U.S. PATENT DOCUMENTS 1,560,789 A * 11/1925 Johnson ................... F16L 11/18
137/355.24
2,525,261 A   10/1950 Henderson
4,036,617 A *  7/1977 Leonard ................. H01B 12/16
62/50.7

(Continued)

FOREIGN PATENT DOCUMENTS

DE   10 2011 004 202 A1   8/2011
EP       2 690 137 A1     1/2014

(Continued)

*Primary Examiner* — Jianying C Atkisson
*Assistant Examiner* — Jose O Class-Quinones
(74) *Attorney, Agent, or Firm* — Blank Rome LLP

(57) ABSTRACT

A device for heat exchange and positioning in a pipe. The device includes a central body containing a material for storing thermal energy by latent heat accumulation, to be placed in thermal exchange with a circulating surrounding fluid. The device also includes structure for positioning the central body in the volume. The positioning structure is connected to, and extends around, the central body The position structure is also connected to reserving passages that enable contact between the central body and the surrounding fluid and the circulation of the surrounding fluid.

19 Claims, 5 Drawing Sheets

(56) References Cited

U.S. PATENT DOCUMENTS

| | | | | |
|---|---|---|---|---|
| 4,079,952 A | * | 3/1978 | Nishio | B60K 15/04 220/86.2 |
| 4,193,271 A | * | 3/1980 | Honigsbaum | B60H 1/005 165/104.13 |
| 4,205,656 A | | 6/1980 | Scarlata | |
| 4,615,359 A | * | 10/1986 | Affa | F16L 59/07 138/104 |
| 4,768,579 A | * | 9/1988 | Patry | F25D 3/00 165/10 |
| 4,807,696 A | * | 2/1989 | Colvin | F28D 20/023 126/400 |
| 5,441,097 A | * | 8/1995 | Kanda | F28D 20/0034 165/10 |
| 5,636,668 A | * | 6/1997 | Thompson | B60K 15/03504 123/41.31 |
| 5,853,045 A | * | 12/1998 | Patry | F28D 20/023 165/10 |
| 8,047,236 B2 | * | 11/2011 | Perry | A61B 1/0055 138/120 |
| 2004/0140010 A1 | * | 7/2004 | Hasslberger | F16L 31/00 138/123 |
| 2005/0167169 A1 | * | 8/2005 | Gering | B60L 58/26 237/12.3 B |
| 2005/0223900 A1 | * | 10/2005 | Yoshida | F02M 25/0854 96/108 |
| 2006/0099361 A1 | * | 5/2006 | Jablonka | C09K 5/063 428/35.2 |
| 2006/0123832 A1 | | 6/2006 | Urfig | |
| 2010/0276121 A1 | * | 11/2010 | Sagie | F28D 7/1607 165/110 |
| 2011/0240249 A1 | * | 10/2011 | Powell | F02M 26/05 165/41 |
| 2012/0006504 A1 | * | 1/2012 | Sugiura | F28D 20/023 165/10 |
| 2013/0199164 A1 | * | 8/2013 | Levin | F28D 20/02 60/299 |

FOREIGN PATENT DOCUMENTS

| | | |
|---|---|---|
| EP | 2 727 646 A1 | 5/2014 |
| EP | 2 690 141 B1 | 10/2017 |
| GB | 2 267 962 A | 12/1993 |
| WO | WO 2015/164628 A1 | 10/2015 |
| WO | WO 2016/016428 A1 | 2/2016 |

* cited by examiner

MOVING DEVICE FOR CENTERING IN A PIPE

The present invention relates to the field of thermal management. This applies in particular to:
a system comprising a fluid circulation pipe, a plurality of devices for heat exchange and positioning in a volume, arranged therein,
a fluid circulation pipe integrating, in its wall (therefore manufactured with) several such devices,
and a thermal management method in such a pipe.

In a volume, a fluid circulating therein may, at a certain time, carry thermal energy which, if stored then, can be delivered later, in this volume, for example to the same fluid which may then have to circulate at another temperature, and therefore be able to benefit from this (at least partial) delivery of thermal energy.

For example, in a motor vehicle, the engine oil is very hot when the propelling engine has been running for some time. It may then be useful to store some of this thermal energy. On the other hand, when cold-starting the engine, heating the engine oil would be useful for engine performance and for limiting pollutant emissions.

In addition to the method used for storing, and then delivering thermal energy, a problem also arises as regards the best way to perform this function, with a sufficient output, without excessively affecting the flowing of the fluid in the concerned volume.

Therefore, a system for circulation and heat exchange with a fluid is provided, with such system comprising:
a pipe having a fluid circulation internal volume, with the pipe comprising a wall,
a plurality of devices for heat exchange and positioning in said volume, with each device being positioned in said pipe, surrounded by its wall and containing a material for storing thermal energy by accumulation of latent heat to be placed in heat exchange with a circulating surrounding fluid, at least some of said heat exchange devices being capable of contacting the pipe wall.

As an alternative embodiment, a system for circulation and heat exchange with one said fluid is proposed, with such system comprising:
a pipe having an internal volume for the circulation of fluid, with the pipe comprising a wall and being locally separated into several branches in which the fluid flows in parallel,
a plurality of devices for heat exchange and positioning in said volume, with the devices being positioned in said branches, surrounded by their walls, with each device containing a material for storing thermal energy by accumulation of latent heat to be placed in heat exchange with a circulating surrounding fluid, at least some of said devices being able to come into contact with the wall of the pipe.

Thus, it will be possible to maintain a high flow rate even with several devices in a row, with the devices being placed in the branches, surrounded by their walls. And heat exchange devices occupy a major part of the pipe section, resulting in high efficiency in terms of heat exchange.

It will be understood that the pipe considered may in particular be a hose or one of the many hoses that run through a vehicle.

To effectively position the central body, it is proposed that each said device should comprise:
a central body containing said material for storing thermal energy by latent heat accumulation, and
a structure for positioning the central body in the volume, with the positioning structure being connected or linked to the central body around which it extends and reserving passages enabling contact between the central body and the fluid.

In order to promote a significant volume of thermal energy storage material in each exchange device, it is proposed that said devices should define a string of such devices following each other in the volume and the central body positioning structures of which will then come into contact with the wall of the pipe.

Taking into account the shapes of the volume, and in particular bends in a substantially cylindrical pipe of circular cross-section, which could alter a positioning that would be adapted to a rectilinear configuration for example, it is also proposed that the positioning structure should include an external structure:
(substantially or globally) defining a cylinder,
and connected by transverse arms to the central body.

In a (substantially or globally) cylindrical pipe with a circular section, a positioning structure comprising an external structure defining a ring and connected by transverse arms to the central body may be sufficient.

An advantage will be to be able to reduce the interval between two central bodies of two adjacent or successive devices since the positioning structure will then only extend (substantially) in one plane. Outside this plane, two adjacent devices may follow each other and be in contact.

And in order to take into account the above-mentioned difficulties of installation, if bends or meanders in a pipe as mentioned above, a system comprising several devices connected together by a flexible link, and in particular with a succession of external structures each defining a ring, can be proposed.

By acting on the link, it will be possible to act on the rings staggered in the pipe and to orient same in the latter.

For a self-positioning, whatever the shape of the volume considered, and a surrounding fluid flow that is also independent of the position of the device in the volume, it is proposed that the positioning structure should include an external structure:
defining a discontinuous sphere (with fluid passage and circulation openings),
and connected by transverse arms to the central body.

If the positioning structure with a diameter of about 2 cm is connected to a central body with a diameter of about 1 cm by about fifteen straight rods having a cross-section of filamentary dimension (therefore of the order of 1 mm) and if the discontinuous sphere also consists of rectilinear but curved rods, it will be possible to combine strength, energy performance and respect for a circulation without excess pressure drop.

Preferably, the central body will be defined by a sphere or of a profile. The sphere is omnidirectional.

In the above embodiments with external structures, the latter will a priori be radially distant from the central body. This is typically advantageous in a pipe where the transverse arms will only provide a radial mechanical connection to the central body with little resistance to fluid flow.

In another case, it may be necessary to favour the number of devices per cm2, by increasing the heat exchange surface, without increasing the external volume of the device, in order to obtain a maximum heat exchange.

Preferably, each central body can also be defined by a sphere, to be easily used and distributed, with a minimum of dead space volume.

As for the positioning structure, it can advantageously be defined by, surrounding the central body, in contact therewith:

a honeycomb structure,
or one or more linear beads (expanded like a strip) surrounding the central body,
or recesses formed in the external surface of said body.

In this way, on the one hand, the exchange surface between the body and the surrounding fluid coming into contact with it will be increased, and on the other hand, the passage of this fluid will be promoted, depending on the case between the beads or in the cells, or in said recesses, which will then define natural fluid passage channels.

The device produced will advantageously be a single-piece moulding integrating the positioning structure and the central body then containing the thermal energy storage material.

And this material will advantageously include at least one PCM (phase change material) enabling high energy performance.

As regards the use of the device, it is worth noting that it is interesting to directly build a fluid circulation pipe, so that it integrates, in a single-piece, several said devices having all or part of the above-mentioned characteristics, with external structures of the devices:
which are each solid to define each a portion of the pipe wall, and are connected to each other in a fluid-tight manner.

Advantageously, the positioning structure will comprise an external structure defining a cylinder and connected by transverse arms to the central body, with the external structures of the devices. In this case, the second function of the devices used will be to serve as a channelling wall, instead of the pipe wall, via their successive external structures.

This will allow the functions to be combined without the need for an additional external pipe.

For all purposes, it is furthermore confirmed that a phase-change material—or PCM—refers to a material capable of changing physical state, between solid and liquid, within a restricted temperature range between −50° C. and 180° C. The heat transfer (or thermal transfer) can be achieved by using the Latent Heat (LH) thereof: the material can then store or transfer energy by changing state, while keeping a substantially constant temperature, that of the change of state.

The thermally insulating material(s) associated with the PCM(s) may be a "simple" insulator such as glass wool, but a foam, for example of polyurethane or polyisocyanurate, will certainly be preferred.

BRIEF DESCRIPTION OF THE DRAWINGS

The invention will, if necessary, be better understood and other details, characteristics and advantages of the invention will become apparent on reading the following description given as a non-exhaustive example and with reference to the accompanying drawings in which.

DETAILED DESCRIPTION OF THE PREFERRED EMBODIMENTS

Figure 1:
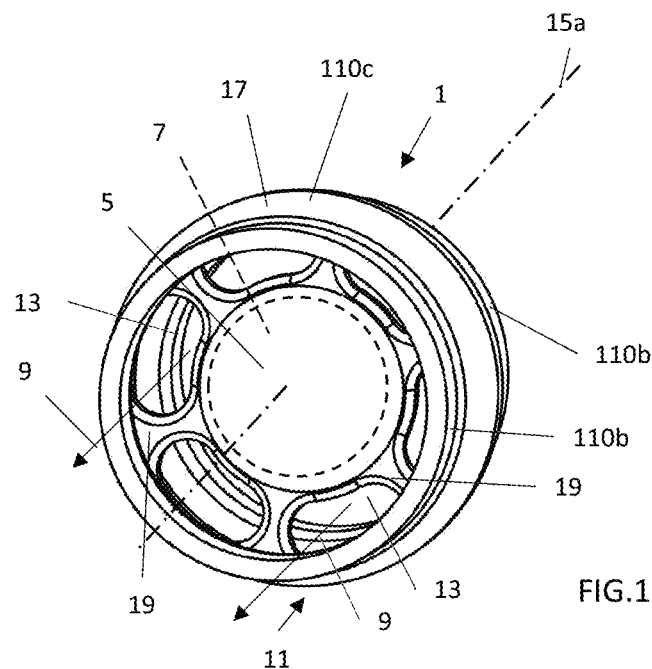
FIGS. 1, 2, 3 schematize the first three examples where a positioning structure ensures an axial centering of a central body in a volume.

Several configurations of the device 1 for heat exchange and positioning in a volume 3 can therefore be imagined.

Systematically, the device 1 will include:
a central body 5 containing a material 7 for storing thermal energy by latent heat accumulation, to be placed in thermal exchange with a circulating surrounding fluid 9, and
a structure 11 for positioning the central body in said volume, with the positioning structure 11 being connected to the central body 5, around which it therefore extends, and reserving passages 13 enabling fluid contact between the central body 5 and the surrounding fluid 9, with a maintained circulation of said fluid.

On the first three preferred examples below, the positioning structure 11 can ensure an axial centering of the central body 5 in the volume, when the positioning is in a pipe 15, therefore in a tubular means. The positioning structure 11 will reserve the passages 13 between same and the central body 5, transversely or radially to the general axis 15a of the pipe 15. And it is through this positioning structure 11 that the contact of device 1 with the wall 31 of pipe 15 is made.

In the first example, as shown in FIG. 1, the positioning structure 11 includes an external structure 17 (substantially or globally) defining a cylinder, to orientate along the axis 15a and connected by transverse arms 19 to the central body 5.

Figure 4:
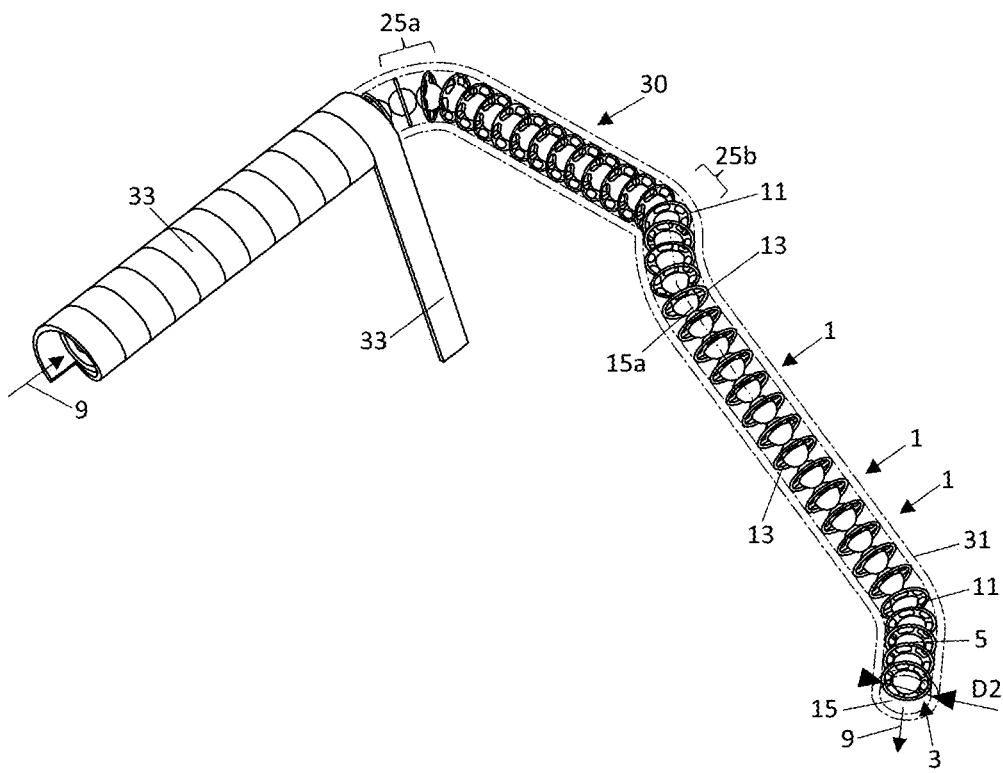
FIG. 4 shows in a transparent view the solution of the device in FIG. 2 in place as a string in a pipe.

With this hollow external structure 17 and thin arms an axial self-centering, for example in the pipe 15 of FIG. 4, will be easy and relevant, providing then an orientation of the cylinder 17 along the axis 15a.

As in the following embodiments, the body 5 is here defined by a sphere. But it can be shaped like a shell, to further limit pressure drops, with a volume reserved for material 7 which can remain the same.

The cylinder 17 may not be solid, but consist of branches or lines defining such a cylindrical envelope, but with passages through it to lighten same.

Figure 2:
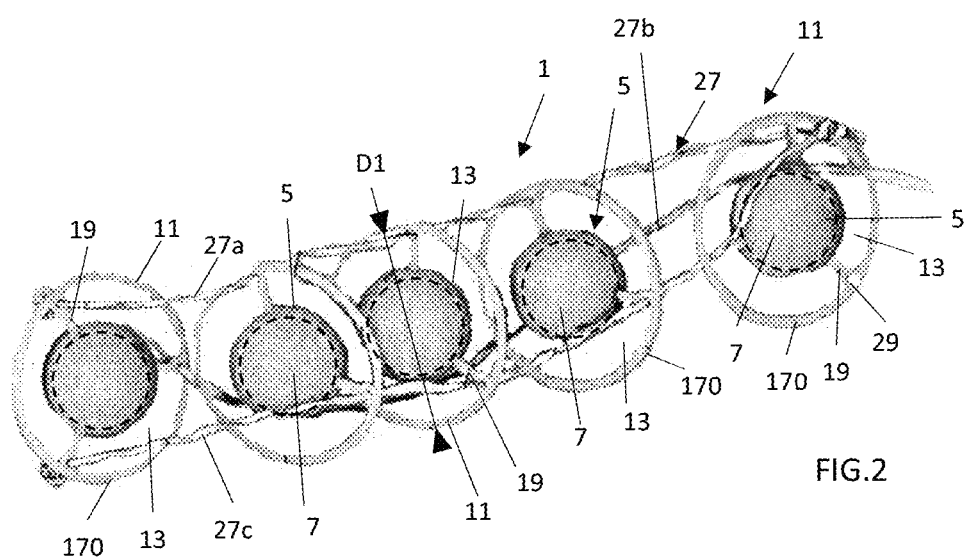

In the second example, as shown in FIG. 2, the positioning structure 11 includes an external structure 170 defining a ring and also connected to the central body 5 by transverse, or radial, arms 19.

Figure 3:
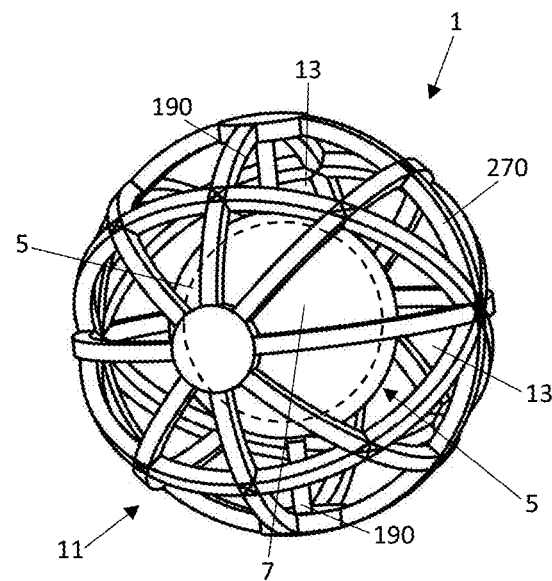

In the third example, as shown in FIG. 3, the positioning structure 11 includes an external structure, 270 defining a discontinuous sphere and connected by transverse or radial arms 190 to the central body 5 containing the material 7.

The first and third examples are self-centering solutions in a pipe, or even in a volume 3 which would be formed by the hollow interior 21 of a housing.

Figure 5:
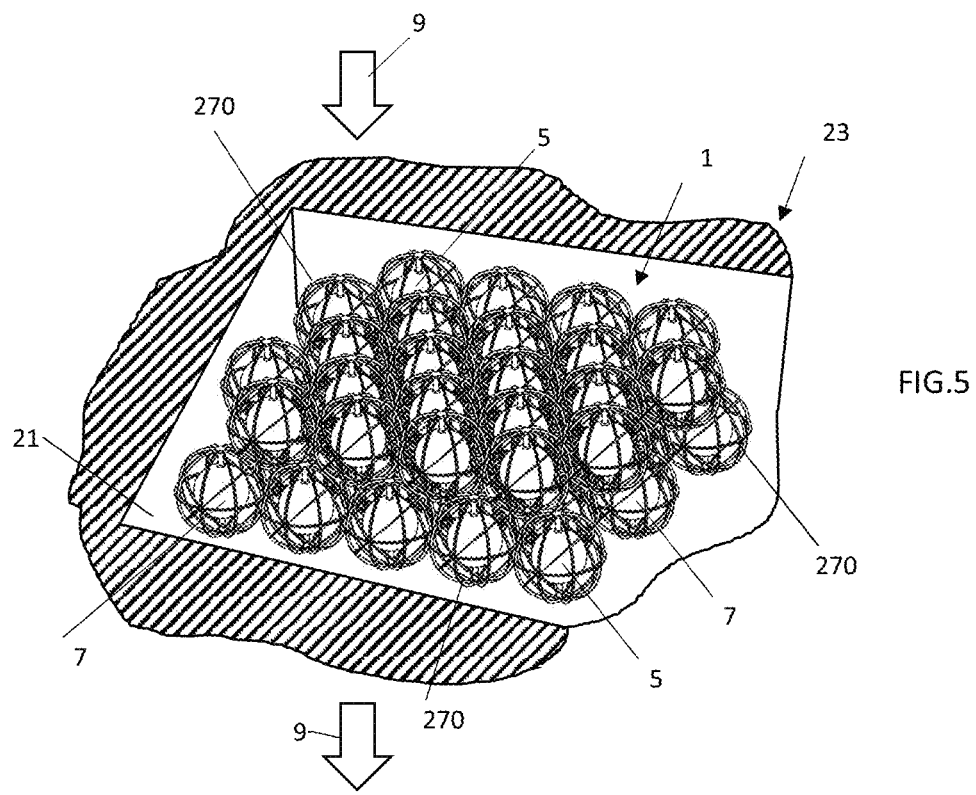
FIG. 5 shows a set of devices as shown in FIG. 3 in place in another pipe.

FIG. 5 shows a part of another pipe 23 (such as a hose) with a wall 31, which always has an inlet and an outlet for the fluid 9 (arrows) and here contains a multitude of devices 1 according to those in the third example. Several devices 1 could be provided in the pipe, abreast, and in contact with each other; with the fluid flowing through the successive passages 13.

In all the exemplary embodiments mentioned in this description, the material 7 may consist of at least one PCM.

It may particularly be PCMs encapsulated (typically microencapsulated) in a porous matrix, with open pores, preferably of the elastomer type, such as a silicone-, NBR- or HNBR-based one. For each body 5, a rubber composition as described in EP2690137 or EP2690141 may be used.

The material 7 may also be based on paraffin, eutectic (myristic-capric) fatty acid or eutectic hydrated salt (calcium chloride+potassium). Other possibilities still exist for each body 5, such as a PCM impregnated in a porous network.

It should be noted, however, that any PCM may have a change of phase or state at a predetermined temperature peak or which is established over a more or less wide temperature range. Thus, with a pure PCM (such as a paraffin) the state change temperature will be constant, while it may be non-constant with several PCMs, such as for example a mixture of paraffins.

In the second example as shown in FIG. 2, it should also be noted that, even if, for example, FIG. 4 shows a string of devices 1 each with an external diameter D1 of the positioning structure 11 approximately equal to, or just below, the internal diameter D2 of the wall 31 of the pipe 15 to pass freely therethrough, there may be problems with the passage of bends as in zones 25a, 25b.

It is therefore proposed to connect together a series of several devices 1 positioned in a line or a string, as shown in FIG. 2, using a flexible link 27 enabling at least some of the rings 170 to be oriented from outside the pipe 15 so as to bring them closer to a position where these rings are in a plane radial to the local axis 15a of the pipe.

The flexible link 27 may include three filamentary strands passing through three openings (such as the one marked 29), provided each in one arm 19, near the ring 170 considered.

An overlength of the filamentary strands will make it possible to operate same from a distance, once the string has been slipped into the pipe 15.

In the embodiment of the system 30 for circulation and heat exchange with the fluid 9 illustrated in FIG. 4, it should also be noted that the solid wall 31 which delimits the volume 15 is surrounded by a thermal insulator 33 which will promote thermal management at the location of this pipe, with the devices 1 placed inside. The same could be true in the case of FIG. 5 where not all devices 1 are in line one behind the other.

In the case of the examples in FIGS. 3 and 5 and following, these are omnidirectionally self-centering solutions in a pipe.

Figure 6:
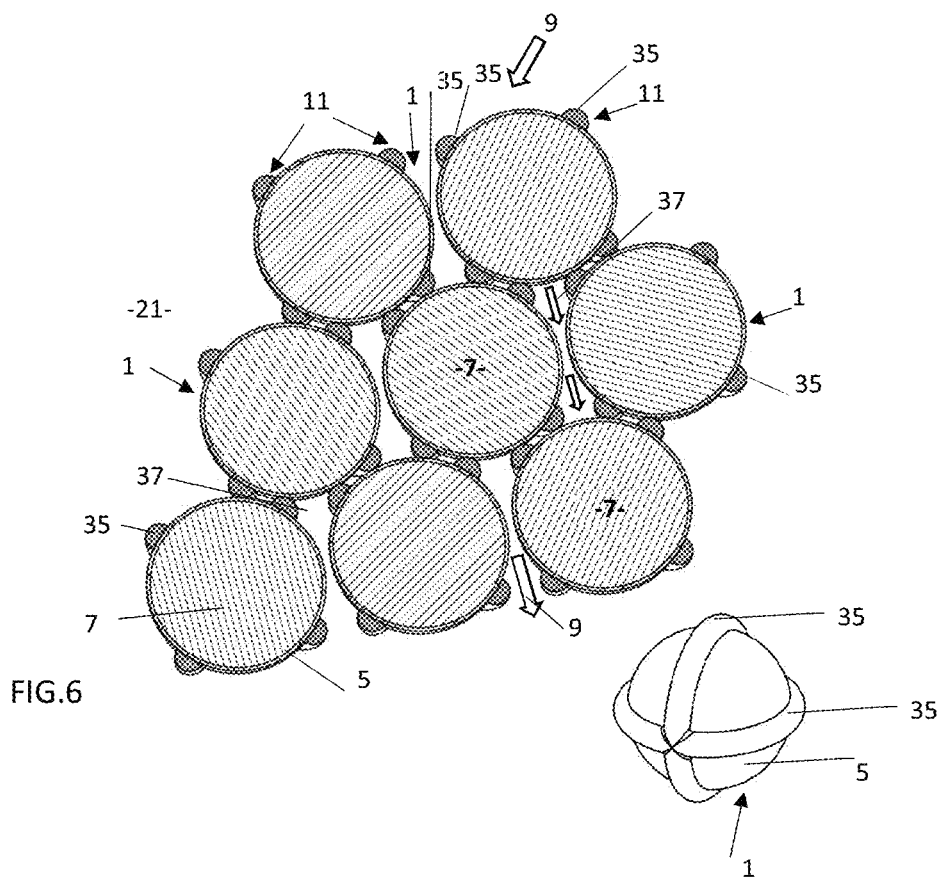
FIGS. 6, 7, 8 show three other examples (in cross-section and volume) where a positioning structure provides a spacing enabling the fluid flow between the devices illustrated positioned in a volume.

In the example shown in FIG. 6, the positioning structure 11 of each device 1 is defined by several beads 35 surrounding the central body 5 containing the material 7 for storing thermal energy by latent heat accumulation.

The beads 35 can define at least two intersecting strips so as to maintain a free space 37 between several devices 1, each having a spherical shape here, so that, when placed in the hollow interior 21, these shapes 1 accumulate in the highest possible number, without loss of space, while enabling the fluid 9 to flow with a heat exchange between them.

Figure 7:
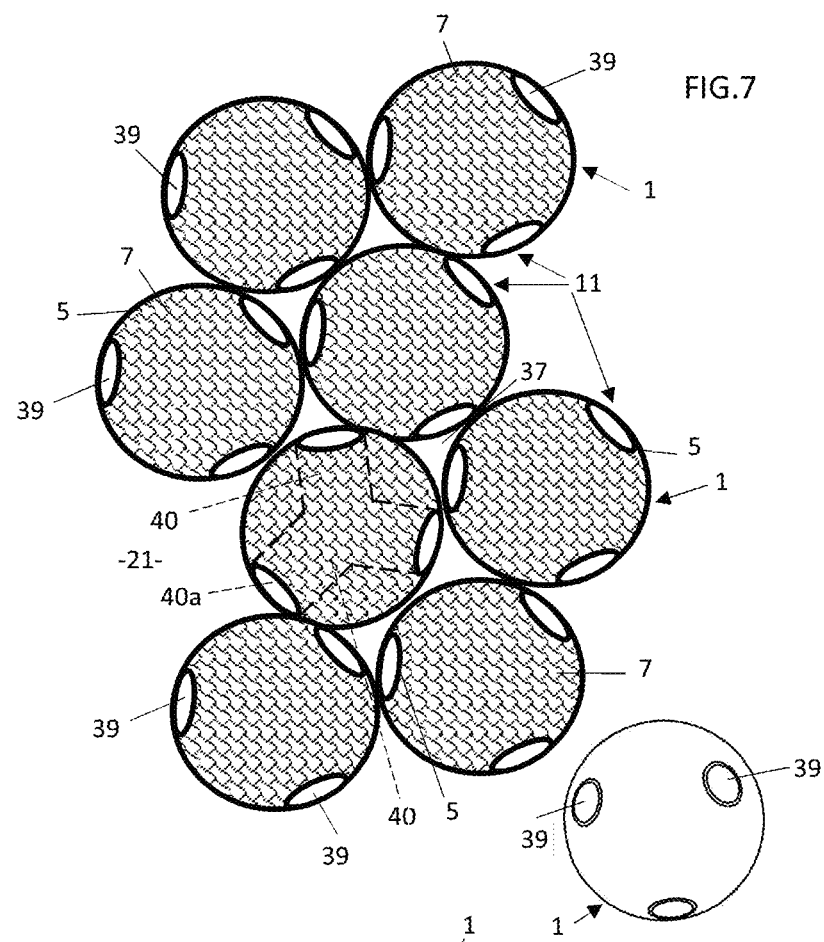
Figure 8:
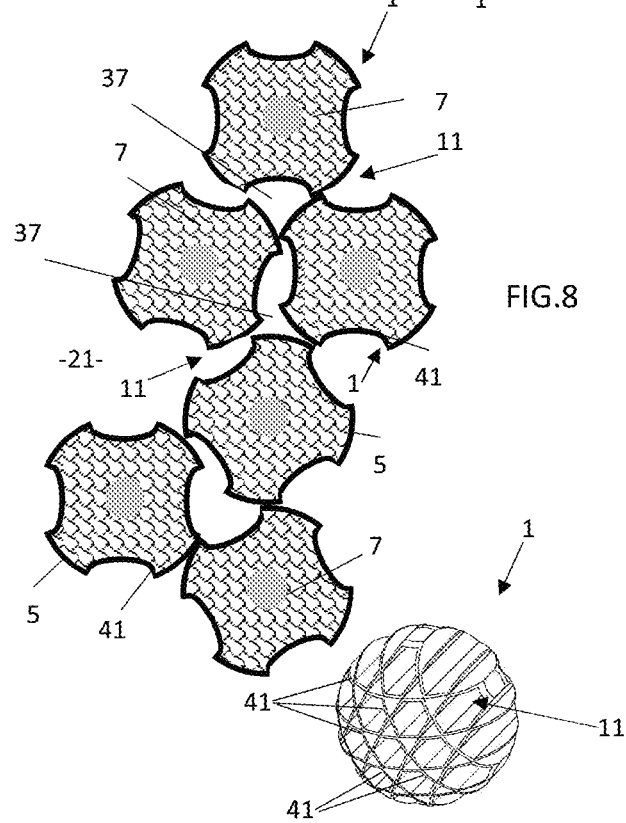

The same comment can be applied to the second and third examples in FIGS. 7, 8 where, respectively, the positioning structure 11 is defined by:
recesses 39 formed in said body 5,
and a honeycomb structure 41 surrounding the central body 5, when in contact therewith.

The free spaces 37 between the devices 1 placed in the hollow interior 21 will still exist, each having a general spherical shape.

The recesses 39 will form blind cavities, for example each as a portion of a sphere.

In both cases, the central body 5 will extend at the bottom of said recesses and cells, or even between them.

The honeycomb structure 41 will also be open to the outside.

For producing any of these structures, it may be preferable to use a single-piece casting between the positioning structure 11 and the body 5. With reference to the above, the central body 5 could therefore be a porous matrix, with open pores, for example of the elastomer type.

In terms of heat exchange coefficient with comparable diameters, the solution in FIG. 8 is the most efficient one, followed by FIG. 7 and FIG. 6.

It should be noted that FIG. 7 also schematises in dotted lines an alternative solution to the recesses 39, namely orifices 40 going through the body 5, the lips 40a of these orifices which lead to the outside (and which extend around the central body, locally) having little risk of being blocked by a solid wall part of another, here spherical device 1. The orifices 40 will define the above passages through which the surrounding fluid passes.

Figure 9:
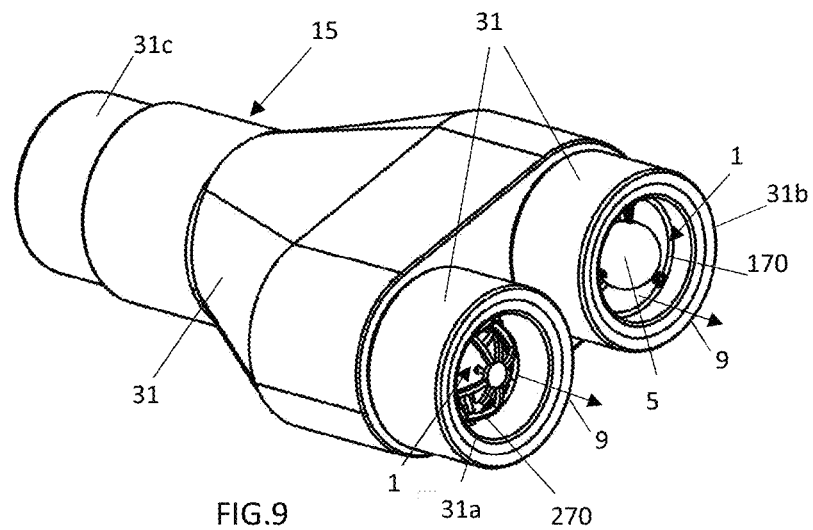
FIG. 9 shows one embodiment of a double-branch pipe with heat exchange function allowing flow rate preservation.

Yet another exemplary embodiment is shown in FIG. 9.

It is again a system for circulation and heat exchange with a fluid, with such system comprising:
a fluid circulation pipe 15, with the pipe comprising a wall 31 and being locally separated into several branches 31a, 31b wherein the fluid 9 from the upstream part 31c of the pipe flows in parallel,
and a plurality of devices 1, with such devices being positioned in said branches, for example in a string, surrounded by their common wall 31.

Figure 10:
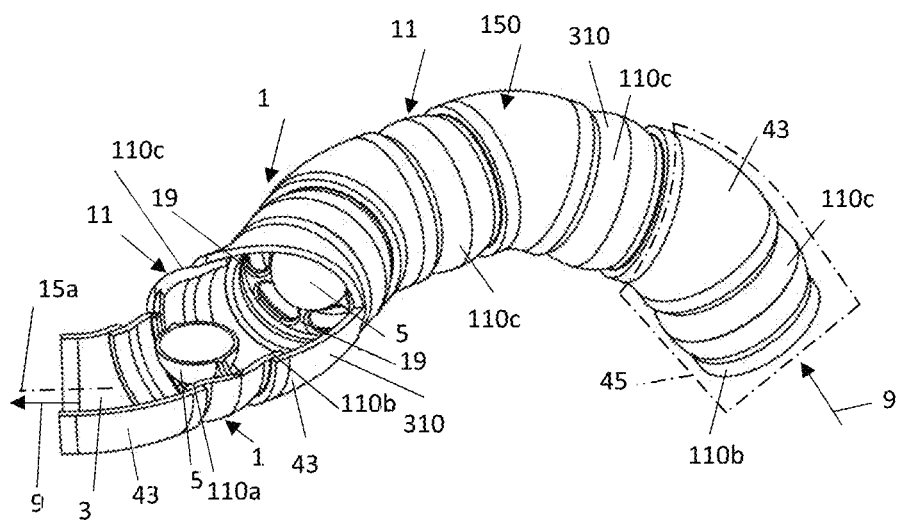
FIG. 10 shows a diagram of a pipe version with integrated heat exchange and positioning devices, with pull-out.

Another scenario has also been provided for, which is schematically shown in FIG. 10, where the fluid 9 circulation pipe 150 comprises, and indeed integrates, a string of several devices 1 arranged in series, thus with its external structures 11, which are each solid to define each a portion of the wall 310 of the pipe and are connected to each other in a fluid-tight manner.

So it is s a one-piece structure that is used here.

The devices 1 of the string follow one another axially (axis 15a). This is individually the solution of FIG. 1, with the external structure defining a cylinder oriented along the axis 15a, and linked by transverse arms 19 to the central body 5. These cylinder sections each form a portion of the cylindrical wall 310 of the pipe 150.

The external structure 11 of each device 1 may have two cylindrical end pieces 110a, 110b axially connected by an intermediate part 110c which, although substantially or generally cylindrical, will be curved outwards or inwards to form an axial stop against inter-engagement with either adjacent devices 1 or tubular connections 43 axially interposed between two successive devices 1 and defining, like these (with the structures 11), a portion of the generally cylindrical wall 310 of the pipe 150.

Such a modular assembly will be practical to use and will make it possible to create pipes of various shapes, especially if the connections via the end pieces 110a, 110b are sockets leaving a relative pivoting free, with tubular connections 43 for some angled fittings (see illustration in FIG. 10).

Said generally cylindrical wall 310 could also be surrounded by another, thin, flexible, wall 45 made of a flexible plastic material which the wall 310 will give its shape to.

The invention claimed is:
1. A system for circulation and heat exchange with a fluid, the system comprising:
a pipe having an internal volume for circulating the fluid, in which the fluid can circulate, between an inlet and an outlet, the pipe comprising a wall,
several movable devices for heat exchange in said internal volume, with each movable device being arranged in said pipe, in which the movable devices are allowed to move, at least some of said movable devices being able to come into contact with the wall of the pipe,
wherein each movable device includes:
  a central body to be placed in heat exchange with the surrounding circulating fluid, the central body including a matrix in which a material for storing thermal energy by latent heat accumulation is distributed, and
  a positioning structure for movably positioning the central body in the internal volume, the positioning structure, which is allowed to slide along the wall when it comes into contact with the wall, being connected to the central body around which it extends, by reserving passages:
    enabling a contact between the central body and the fluid, and
    enabling the fluid to flow in the pipe between the movable devices.

2. The system according to claim 1, wherein the pipe is a hose or one of flexible hoses of an oil circuit of a vehicle and the pipe is connected to an oil source to deliver oil to said hose.

3. The system according to claim 1, wherein the devices for heat exchange and positioning in said internal volume define a string of such devices that follow each other in the internal volume and the central body positioning structures of which come into contact with the wall.

4. The system according to claim 1, wherein the positioning structure is free of material for storing thermal energy by latent heat accumulation, and the positioning structure of at least some of said movable devices is adapted to come into contact with the wall and comprises an external structure defining one of a cylinder and a ring and connected by transverse arms to the central body, each of said passages being defined between two transverse arms.

5. The system according to claim 1, wherein the positioning structure of at least some of said movable devices:
  is adapted to come into contact with the wall, and
  includes an external structure:
    connected by transverse arms to the central body, and,
    delimited by a discontinuous sphere comprising discrete elongated curved bars, each defining a continuous curved surface there along, the discrete elongated curved bars being adapted to limit to said continuous curved surfaces said contact with the walls.

6. The system according to claim 1, wherein the positioning structure is defined by a cellular structure surrounding the central body, in contact with the central body and which includes a series of rings, each defining a continuous curved surface there along that limits to a portion of some of said continuous curved surfaces said contact with the wall.

7. The system according to claim 1, wherein the positioning structure is defined by at least one linear elongated curved bead surrounding the central body, in contact with the central body, the at least one elongated curved bead defining a continuous curved surface there along that limits to a portion of said continuous curved surface said contact with the wall.

8. The system according to claim 1, wherein the positioning structure and the central body are made of a one-piece casting including the matrix.

9. The system according to claim 1, wherein several of said movable devices are connected together in a string by a flexible link.

10. The system according to claim 1, wherein the matrix is a porous matrix.

11. The system according to claim 1, wherein the matrix is an elastomeric porous matrix.

12. The system according to claim 1, wherein the matrix is a porous network impregnated with the material for storing thermal energy by latent heat accumulation.

13. The system according to claim 1, wherein the material for storing thermal energy by latent heat accumulation includes a plurality of phase change materials having different phase change temperatures.

14. The system according to claim 1, wherein the matrix comprises a porous material, and the material for storing thermal energy by latent heat accumulation comprises a phase change material encapsulated in said porous material.

15. The system according to claim 1, wherein the positioning structure comprises recesses distributed around said body so that the recesses:
  define at least some of said passages enabling the fluid to flow in the pipe between the devices, and,
  reserve there between, around said body, a continuous curved surface that limits to a portion of said continuous curved surface said contact with the wall.

16. A pipe for circulating a fluid, the pipe having an internal volume and comprising a plurality of devices for thermal exchange and positioning, with each device comprising:
  a central body containing a material for storing thermal energy by latent heat accumulation, to be placed in thermal exchange with a circulating surrounding fluid which circulates in said internal volume, and
  a positioning structure for positioning the central body in the internal volume, the positioning structure, being connected to the central body around which it extends and reserving passages, enabling a contact between the central body and the surrounding fluid and the circulation of said fluid, the positioning structure comprising an external structure defining a cylinder and linked by arms transverse to the central body, the external structures of the movable devices:
  each being solid to define each a portion of a wall of the pipe, and
  being connected to each other in a fluid-tight manner.

17. A method for thermal management in a pipe having an internal volume for circulating a fluid, wherein:
  several movable devices for heat exchange in said internal volume are arranged in the internal volume, in a single-file, with each movable device comprising:
    a central body including a matrix in which is distributed a material for storing thermal energy by latent heat accumulation, to be placed in thermal exchange with the fluid, and
    a positioning structure for movably positioning the central body in said hollow interior, with the positioning structure, which is allowed to slide along the wall where it comes into contact with the wall, being connected to the central body around which it extends and reserving passages enabling a contact between the central body and the surrounding fluid and the circulation of said fluid, and
  the fluid is circulated in the internal volume along the pipe in successive thermal exchanges with the thermal energy storage materials of the successive central bodies.

18. A system for circulation and heat exchange with a fluid, the system comprising:
  an enclosure having an internal volume for circulating the fluid, in which the fluid can circulate, between an inlet and an outlet, the enclosure comprising a wall, several devices for heat exchange and positioning in said internal volume, with each device being arranged in said enclosure, surrounded by said wall, at least some of said heat exchange devices being able to come into contact with the wall of the enclosure, wherein each device includes:

a central body to be placed in heat exchange with the surrounding circulating fluid, the central body including a material for storing thermal energy by latent heat accumulation, and a positioning structure for positioning the central body in the internal volume, the positioning structure, which is allowed to slide along the wall where it comes into contact with the wall, being connected to the central body around which it extends, by reserving passages:

enabling a contact between the central body and the fluid, and enabling the fluid to flow in the enclosure between the devices, at least some of the positioning structures having a continuous curved surface that limits to a portion of said continuous curved surface said contact of the heat exchange devices with the wall.

19. The system according to claim 18, wherein the continuous curved surface defines a perimeter extending all-around said device.

* * * * *